(12) United States Patent
Kato

(10) Patent No.: US 6,172,724 B1
(45) Date of Patent: Jan. 9, 2001

(54) LIQUID CRYSTAL DISPLAY DEVICE WITH POLARIZER CUTOUT FOR CONSTANTLY DIPLAYED INFORMATION FOR CAMERA FINDER

(75) Inventor: Koichi Kato, Omiya (JP)

(73) Assignee: Fuji Photo Optical Co., Ltd., Omiya (JP)

( * ) Notice: Under 35 U.S.C. 154(b), the term of this patent shall be extended for 0 days.

(21) Appl. No.: 09/229,119

(22) Filed: Jan. 12, 1999

(30) Foreign Application Priority Data

Apr. 20, 1998 (JP) .................................................. 10-109724

(51) Int. Cl.⁷ ........................... G02F 1/1335; G03B 17/20
(52) U.S. Cl. ............................................. 349/96; 396/296
(58) Field of Search .................... 349/96, 142; 396/237, 396/290, 291, 292, 296

(56) References Cited

U.S. PATENT DOCUMENTS 4,435,046 * 3/1984 Nishimura ............................. 349/142
4,465,355 * 8/1984 Murakami et al. ................... 396/201
4,514,920 * 5/1985 Shafir et al. ............................ 40/448
4,519,679 * 5/1985 Horikiri et al. ......................... 349/96

FOREIGN PATENT DOCUMENTS 57-173824 10/1982 (JP) .
63-128331 5/1988 (JP) .

* cited by examiner

Primary Examiner—Kenneth Parker
(74) Attorney, Agent, or Firm—Arnold International; Bruce Y. Arnold

(57) ABSTRACT

A liquid crystal display device for use in a camera finder is provided which is capable of enabling a camera user to constantly observe a predetermined information by peeping into the finder. Said liquid crystal display device is formed by a liquid crystal display plate and one or more polarizing plates, at least one polarizing plate is formed with a notch corresponding to an information constantly displayed on the liquid crystal display plate, thereby rendering a user to constantly observe a predetermined information without consuming any electric energy.

3 Claims, 4 Drawing Sheets

LIQUID CRYSTAL DISPLAY DEVICE WITH POLARIZER CUTOUT FOR CONSTANTLY DIPLAYED INFORMATION FOR CAMERA FINDER

BACKGROUND OF THE INVENTION

1. Field of the Invention

The present invention relates to a liquid crystal display device for use in a camera finder, in particular to a liquid crystal display device capable of displaying constant normal information and information needed in photographing operation.

2. Description of the Related Art

In general, there have been known a liquid crystal display device for use in a camera finder, particularly for use in a lighting type finder apparatus, such as that disclosed in Japanese Unexamined Patent Publication Nos. 57-173824 and 63-128331.

With a lighting type finder apparatus employing the above mentioned liquid crystal display device, since a target mark of distance measurement may be displayed by a liquid crystal, there is not any inconvenience when responding to a release signal to display a target mark. However, if a target mark is to be displayed constantly, the driving of liquid crystal will cause a consumption of electric energy, resulting in a problem that buttery inserted therein will be used up too soon.

On the other hand, if a liquid crystal display plate is a glass plate on which a target mark has been printed, a constant displaying does not cause any electric consumption. However, since the target mark can only be seen through a polarizing plate, there is a problem that such target mark can not be seen clearly.

SUMMARY OF THE INVENTION is an object of the present invention to provide an improved liquid crystal display device for use in a camera finder, which allows a user to clearly and constantly see a target mark of distance measurement, and is able to avoid an electric consumption which is otherwise unavoidable for driving the liquid crystal.

In order to solve the above problem, according to the present invention, there is provided an improved liquid crystal display device for use in a camera finder, said display device being capable of displaying a predetermined information within an image of a photographing object and in the vicinity of said image, characterized in that said liquid crystal display device is formed by a liquid crystal display plate and at least one polarizing plate, said liquid crystal display plate is provided with an information constantly displayed and an information needed only at a time of performing a photographing operation, the at least one polarizing plate is formed with a notch corresponding to the information constantly displayed.

Further, with the liquid crystal display device of the present invention, it is possible that only one side of the above liquid crystal display plate is provided with a polarizing plate, alternatively, both sides of the liquid crystal display plate are provided with polarizing plates, at least one polarizing plate is formed with a notch corresponding to the information constantly displayed on the liquid crystal display plate.

With the use of the present invention, a camera user is allowed to peep into the finder to constantly observe a predetermined information such as a target mark in the liquid crystal display device, without consuming any electric energy. Further, during a process of photographing operation, since the liquid crystal display device is driven, it is possible for a user to observe all of the displayed information by peeping into the finder.

BRIEF DESCRIPTION OF THE DRAWINGS

FIG. 3 is an explanatory view schematically indicating one example of a liquid crystal displaying within the finder apparatus when a camera is ON;

DESCRIPTION OF THE PREFERRED EMBODIMENTS

An embodiment of the present invention shown in the accompany drawings will be described in detail below.

Figure 1:
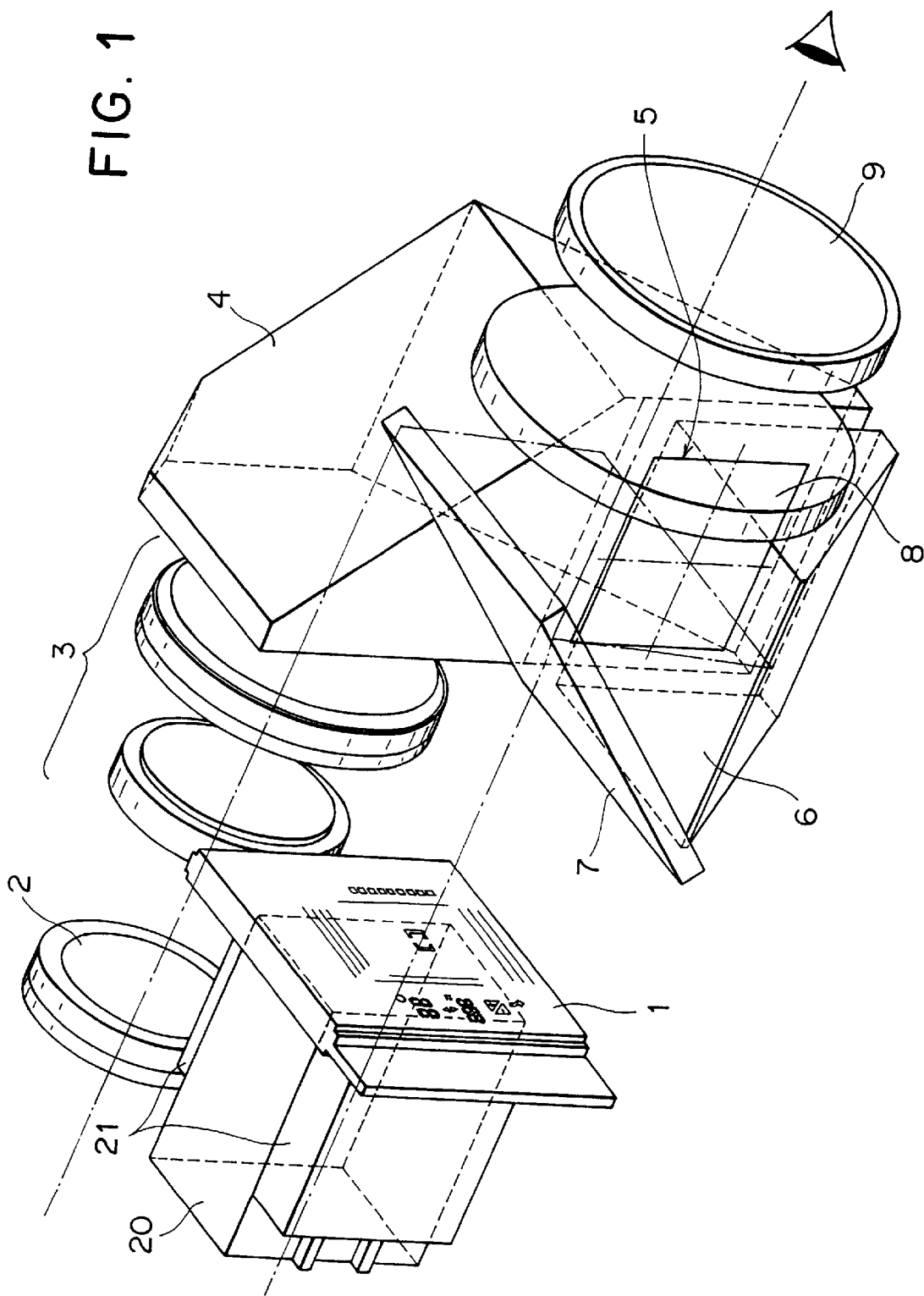
FIG. 1 is a perspective view schematically illustrating a whole structure of the finder apparatus employing a liquid crystal display device made according to the present invention.
Figure 2:
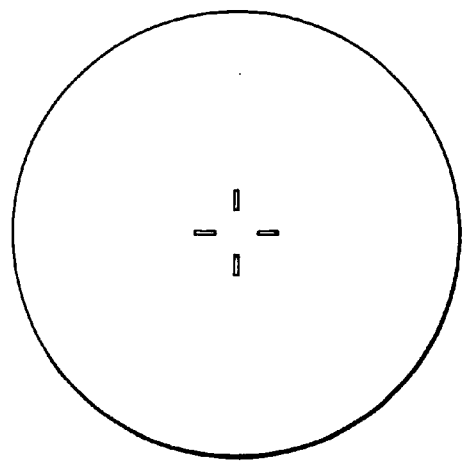
FIG. 2 is an explanatory view schematically indicating one example of a liquid crystal displaying within the finder apparatus when a camera is OFF.
Figure 3:
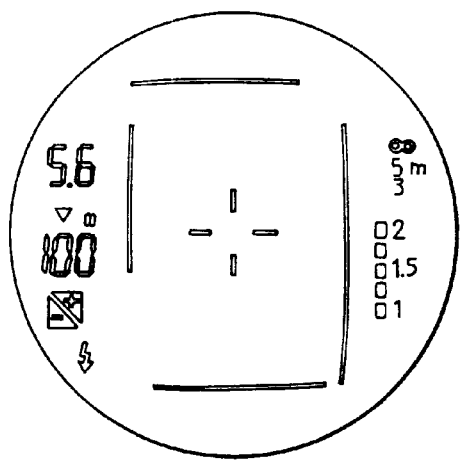
Figure 4:
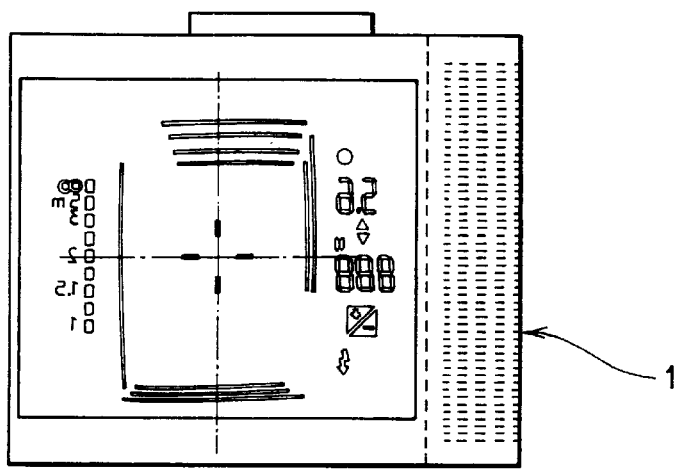
FIG. 4 is an explanatory view schematically indicating the liquid crystal display device.
Figure 5:
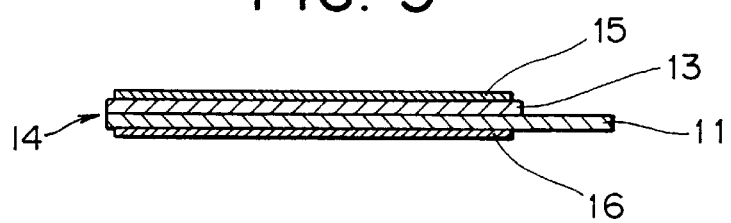
FIG. 5 is a cross sectional view schematically indicating the liquid crystal display device.
Figure 6:
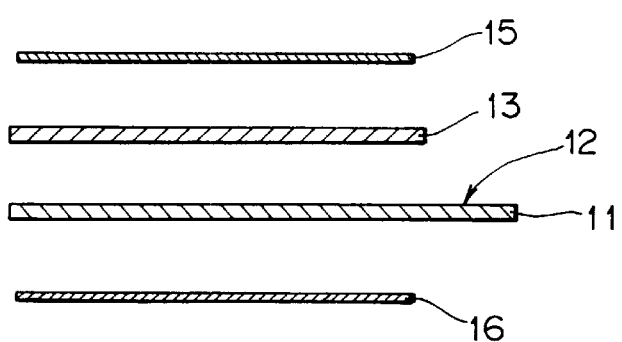
FIG. 6 is an exploded view schematically indicating the liquid crystal display device of the present invention.
Figure 7:
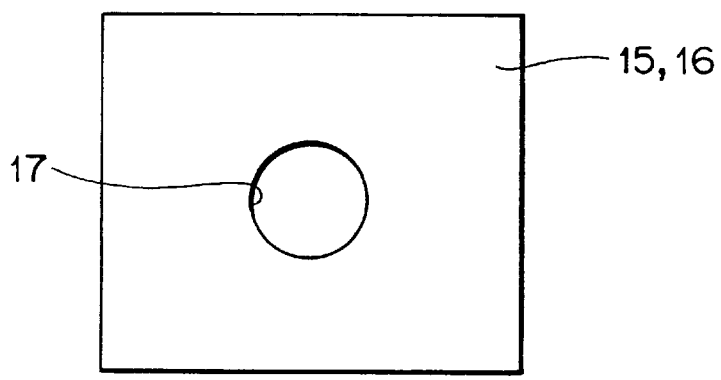
FIG. 7 is an explanatory view schematically illustrating polarizing plates for use in the liquid crystal display device of the present invention.
Figure 8:
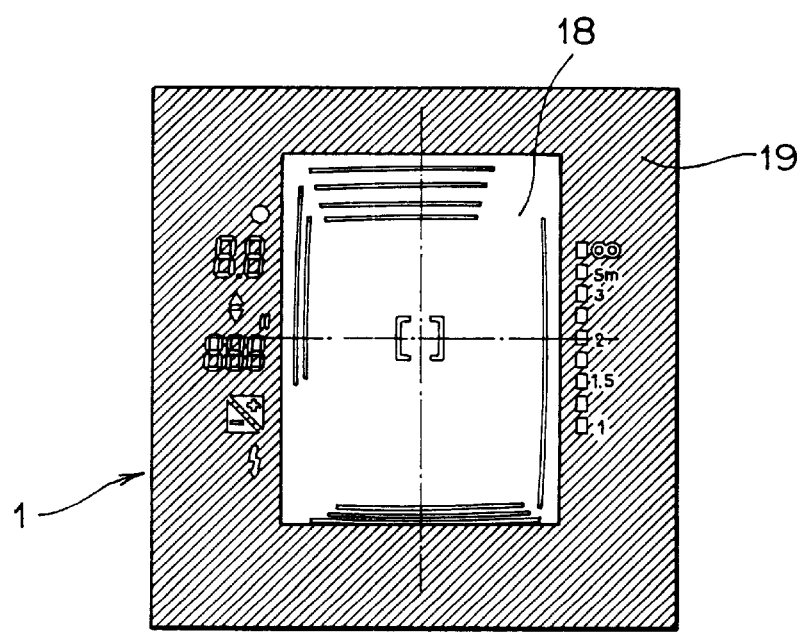
FIG. 8 is an explanatory view schematically illustrating a full displaying state within the finder apparatus under a full lighting condition.

FIG. 1 is a perspective view schematically illustrating a whole structure of a camera finder which is equipped with a liquid crystal display device made according to the present invention, FIG. 2 is an explanatory view schematically illustrating one example of liquid crystal displaying within the camera finder when the camera is OFF, FIG. 3 is an explanatory view schematically illustrating one example of liquid crystal displaying within the camera finder when the camera is ON, FIG. 4 is an explanatory view schematically indicating the liquid crystal display device, FIG. 5 is a cross sectional view schematically indicating the liquid crystal display device, FIG. 6 is an exploded view schematically indicating the liquid crystal display device of the present invention, FIG. 7 is an explanatory view schematically illustrating polarizing plates for use in the liquid crystal display device of the present invention, FIG. 8 is an explanatory view schematically illustrating a full displaying state within the finder apparatus under a full lighting condition.

As shown in FIG. 1, a liquid crystal display device made according to the present invention is used in a lighting type finder apparatus, an image light of a photographing object having passed through an objective lens 2 and movable lens 3 is input into a first Porro prism 4 and is changed in its travelling direction by about a right angle. After passing through a full visual field mask 5, the image light of the photographing object is allowed to arrive at a second Porro prism 6, in which the above image light is changed again in its travelling direction by about a right angle. Then, the image light is passed through a half mirror 7 and is allowed to proceed in the same direction as the image light which is passing through the above objective lens 2, and further pass through a diopter correction lens 8 and an ocular lens 9.

On the other hand, the information displayed on the liquid crystal display device 1 within the finder is positioned on the outside of the image of the photographing object. In the present embodiment, predetermined informations are displayed on both sides of the image of a photographing object.

The above liquid crystal display device 1 can be understood in further detail with reference to FIGS. 4–7. Namely, on one surface of the glass plate 11 there is formed a pattern surface (liquid crystal) 12 capable of displaying predetermined informations. Provided on the pattern surface 12 are another glass plate 13 and a liquid crystal display plate 14. Further, on the outer surfaces of the two glass plates 11 and 13, there are provided polarizing plates 15 and 16, thereby forming the liquid crystal display device 1.

As information to be displayed on the liquid crystal display device 1, there may be a target mark located on the central area thereof, and various other informations (for example, informations indicating if there is a flashing) to be displayed on both sides of the target mark.

Namely, on both incidence surface and emitting surface of the liquid crystal display plate 14, there are provided a polarizing plate 15 and a polarizing plate 16. The two polarizing plates 15 and 16 have through holes in their central areas so that both the polarizing plates 15 and 16 will not cover a position of the target mark located in the center of the liquid crystal display plate 14.

In more detail, in the present embodiment, each of the polarizing plates 15 and 16 has a through hole 17 in the central position thereof. In this way, a part of the liquid crystal display plate 14 corresponding to the holes 17 will not be affected by the polarizing plates 15 and 16.

In this condition, it is either allowable to form a through hole 17 on each of the polarizing plates 15 and 16, or allowable to form a through hole 17 on only one of the polarizing plates 15 and 16.

On the other hand, referring to FIG. 8, a reference numeral 18 is used to represent a transparent portion on which a photographing object image is displayed, while a reference numeral 19 is used to represent a non-transparent portion which is adapted to display an information such as a scale information.

Further, as shown in FIG. 1, there is provided a light guide 20 adjacent to the objective lens 2. Such light guide 20 is used to render an outside incident light to proceed in a direction parallel to a proceeding direction of an image light passing through the objective lens 2. Ahead of the light guide 20 and on one side of the Porro prism 6, there is provided the liquid crystal display device 1.

Further, on both sides of the light guide 20 there are provided a pair of lighting elements such as LED (Light Emitting Diode), so as to illuminate the informations being displayed on both sides of the image of a photographing object.

The operation of the finder apparatus constructed in the manner as described above will be explained in detail below.

At first, an image light of a photographing object is input into the objective lens 2, passed through the movable lens 3, and changed in its travelling direction in the Porro prism 4. Further, the image light is passed through the full visual field 5 and enter the other Porro prism 6 in which its travelling direction is again changed. Finally, the image light is caused to pass through the half mirror 7 and the diopter correction lens 8, before passing through the ocular lens 9.

Upon peeping into the finder, a target mark is visible together with an image of a photographing object on the central area of the liquid crystal plate 14, by virtue of the through holes 17, 17 of the polarizing plates 15 and 16. Further, the target mark and the image are clearly visible also by virtue of the light guide 20.

Namely, a target mark provided on the liquid crystal display plate 14 may be clearly seen by peeping into the finder, without a necessity of seeing through the polarizing plates 15 and 16.

Therefore, the target mark is allowed to be clearly and constantly seen by peeping into the finder, irrespective of whether or not there is existing an image of photograph object.

On the other hand, on both sides of the above light guide 20 there are provided a pair of lighting elements such as LED (Light Emitting Diode) which are used to illuminate the liquid crystal display device 1.

In this way, during a photographing operation, as fast as the camera is ON, the lighting elements 21 may be actuated to illuminate the photographing information displayed on both sides of the image of the photographing object, thereby rendering the interior of the finder to be clearly visible (as shown in FIG. 8).

Under a condition as described above, since the polarizing plates 15 and 16 are not provided on an area of the liquid crystal display plate 14 which contains the target mark, even when the camera is OFF, it is still possible to render the target mark visible upon peeping into the finder. Therefore, the target mark may be constantly displayed without consuming an electric energy which is otherwise unavoidable for driving the liquid crystal (as shown in FIG. 2).

Further, when displaying some other marks provided on the liquid crystal display plate 14 such as a mark representing whether there is a flash, the camera may be made ON and the liquid crystal may thus be driven, so that a user is allowed to peep into the finder while at the same time ensuring that the portions covered by the polarizing plates 15 and 16 will not receive any unfavourable influences from the polarizing plates 15 and 16 (as shown in FIG. 2).

Accordingly, when peeping into the finder, a predetermined mark such as a target mark may be constantly observed without consuming any electric energy. In this way, an electric energy is consumed only during a photographing operation for driving a liquid crystal, thereby permitting a considerable reduction in electric consumption.

The present invention, having been constructed in the above described manner, can provide the following effects. Namely, since a notch is formed on each polarizing plate, and since such notch is corresponding to a position on the liquid crystal display plate which involves a mark to be constantly displayed, it is sure that a mark to be constantly displayed will not be obstructed by the polarizing plates, thereby ensuring a desired observation into the finder. Therefore, it is allowed to dispense with a necessity of driving the liquid crystal, so as to greatly reduce an electric consumption.

Further, since the above effect may be achieved only by cutting notch portions on the polarizing plates, the liquid crystal display device may be made simple in its structure, thereby permitting the manufacture thereof with a low cost.

What is claimed is:

1. A liquid crystal display device for use in a camera finder, said display device being capable of displaying a predetermined information within an image of a photographing object and in the vicinity of said image, characterized in that said liquid crystal display device is formed by a liquid crystal display plate and at least one polarizing plate, said liquid crystal display plate is provided with an information constantly displayed and an information needed only at a time of performing a photographing operation, the at least one polarizing plate is formed with a notch corresponding to the information constantly displayed.

2. The liquid crystal display device according to claim 1, wherein only one side of the above liquid crystal display plate is provided with a polarizing plate.

3. The liquid crystal display device according to claim 1, wherein both sides of the liquid crystal display plate are provided with polarizing plates, at least one polarizing plate is formed with a notch corresponding to the information constantly displayed on the liquid crystal display plate.

* * * * *